United States Patent [19]

Barringer et al.

[11] Patent Number: 4,662,952

[45] Date of Patent: * May 5, 1987

[54] NON-HYGROSCOPIC WELDING FLUX BINDERS

[75] Inventors: Eric A. Barringer, Waltham; Thomas W. Eagar, Belmont, both of Mass.

[73] Assignee: Massachusetts Institute of Technology, Cambridge, Mass.

[*] Notice: The portion of the term of this patent subsequent to Dec. 10, 2002 has been disclaimed.

[21] Appl. No.: 776,894

[22] Filed: Sep. 17, 1985

Related U.S. Application Data

[60] Continuation-in-part of Ser. No. 626,613, Jun. 29, 1984, Pat. No. 4,512,822, and Ser. No. 673,016, Nov. 19, 1984, Pat. No. 4,557,768, which is a division of Ser. No. 626,613.

[51] Int. Cl.$^4$ .............................................. B23K 35/34
[52] U.S. Cl. ....................................... 148/23; 148/24; 148/25
[58] Field of Search ..................................... 148/23-25

[56] References Cited

U.S. PATENT DOCUMENTS

| | | | |
|---|---|---|---|
| 2,564,199 | 8/1951 | Feldman | 148/25 |
| 3,211,591 | 10/1965 | Miltschitzky et al. | 148/26 |
| 3,301,688 | 1/1967 | Simpelaar | 148/23 |
| 3,321,339 | 5/1967 | Schulze | 148/23 |
| 3,328,212 | 6/1967 | Coless | 148/26 |
| 3,340,104 | 9/1967 | Ballass et al. | 148/26 |
| 3,468,999 | 9/1969 | Hillert | 148/26 |
| 3,496,322 | 2/1970 | Gonzalez | 148/26 |
| 3,597,285 | 8/1971 | Aronberg | 148/26 |

Primary Examiner—Peter D. Rosenberg
Attorney, Agent, or Firm—Kenway & Jenney

[57] ABSTRACT

A welding flux binder and welding flux comprising the reaction product of a hydrolyzed and polymerized organometallic compound selected from the group consisting of metal alkoxides including tetraalkylorthosilicate, tetraalkylorthotitanate, tetraalkylorthozirconate and trialkylaluminate, metal esters, and metal oxalates. The organometallic compound is hydrolyzed and then polymerized to form a gel glass phase. Alkali and alkaline earth salts are added to stabilize and reduce the viscosity of the gel. The resulting welding flux binder and flux are non-hygroscopic and have a high fired strength.

23 Claims, No Drawings

NON-HYGROSCOPIC WELDING FLUX BINDERS

BACKGROUND OF THE INVENTION

This application is a continuation-in-part of U.S. Ser. No. 626,613 filed June 29, 1984, now U.S. Pat. No. 4,512,822 issued Apr. 23, 1985, and the divisional application, U.S. Ser. No. 673,016 filed Nov. 19, 1984.

The present invention is in the general field of welding flux binders and in particular discloses a non-hygroscopic welding flux binder formed from a hydrolyzable organometallic compound.

Fluxes are utilized in arc welding to control the arc stability, modify the weld metal composition, and provide protection from atmospheric contamination. Arc stability is controlled by modifying the composition of the flux. It is therefore desirable to have substances which function well as plasma charge carriers in the flux mixture. Fluxes modify the weld metal composition by rendering impurities in the metal more easily fusable and by providing substances which these impurities may combine with, in preference to the metal, to form slag. Fluxes are prepared with a higher or lower percentage of acidic or basic compounds depending on the type of metal to be welded and impurities in the metal. In some instances, other materials may be added to lower the slag melting point and improve slag fluidity, and to serve as binders for the flux particles.

Hydrogen embrittlement is a phenomenon which involves loss of ductility and increased crack susceptibility in steel at room temperature due to the presence of hydrogen in the steel. Hydrogen induced cracking will occur to some extent whenever sufficient hydrogen and stress are present in a hard steel at temperatures above $-100°$ C. and below $150°$ C. As it is almost impossible to avoid producing these stresses in a weld, methods of crack control usually involve controlling the amount of hydrogen present in the weld, the microstructure of the solidified weld metal, or both. Hydrogen can be introduced into the weld arc atmosphere from a number of sources including oxides, wire contaminants and oil. The primary source is moisture in the flux and flux binder, which attaches the flux to the outside of a shielded metal arc weld electrode.

Most welding electrode flux formulations consist of an oxide-based flux and additives bonded together by sodium silicate. Sodium silicate binders have two important disadvantages. They are very hygroscopic and they require moisture to keep them sound and free from cracks. During welding, the heat evaporates and dissociates the water, evolving hydrogen gas which dissolves into the metal. Under stress, the dissolved hydrogen may produce cracks with the potential for catastrophic failure. In an effort to decrease the possibility of failure, sodium silicate welding electrodes are dried at $1100°$ C. to decrease the water content of the flux to less than 0.2%. The dried electrodes can then be used for only a limited time before the flux again absorbs moisture from the air and has to be redried.

A second problem with sodium silicate weld fluxes is their lack of a $CO_2$ generating compound. $CO_2$ aids in operability of the flux by increasing the stability of the arc and by excluding atmospheric contamination, particularly $N_2$, from the metal. Drying the electrodes at $1100°$ C. decomposes $CO_2$ sources such as calcium carbonate, but does not allow diffusion of the calcium into the sodium silicate to form an intimate mixture which is non-hygroscopic. Another problem with drying of these fluxes at $1100°$ C. is that metallic powders, which may be added to provide alloying of the weld metal, oxidize during the baking operation.

In U.S. Ser. No. 626,613, now U.S. Pat. No. 4,512,822 issued Apr. 23, 1985, and U.S. Ser. No. 673,016, applicants disclosed a welding flux binder hydrolyzed and polymerized from a mixture of tetraalkylorthosilicate, $Si(OR)_4$, wherein R is $-CH_3$, $-C_2H_5$ or $-C_3H_7$, alkali and alkaline earth salts. The welding flux made with the binder comprises an alkali-alkaline earth silicate, $M_2O.M'O.SiO_2$, wherein M is lithium, sodium potassium, or other element in Group I of the Periodic Table and M' is magnesium, calcium, barium, or other element in Group II of the Periodic Table and may further comprise metal compounds. About 5-10% of the weld flux mixture consists of weld flux binder, with the flux making up the remainder.

Tetraalkylorthosilicate is an organometallic precursor to a ceramic binder. The organic portion is removed during processing of the weld flux binder and is not present in the final product. Unlike the prior art welding flux binders, the binder contains a homogeneous distribution of alkali and alkaline earth ions and is not hygroscopic. This is a result of the use of tetraalkylorthosilicate and the presence of compounds which react to form CaO, MgO, BaO, or other alkaline earth oxides. The oxide compounds, particularly calcium compounds, act as stabilizing agents and make the fired binder non-hygroscopic. Alkali compounds, particularly potassium, significantly reduce the viscosity of the glass, lowering the temperature required to sinter the binder.

It is therefore an object of the present invention to provide a non-hygroscopic welding flux binder and welding flux.

It is another object of the present invention to provide a welding flux binder and welding flux which can be produced and processed at a temperature less than $1000°$ C. so that compounds of low stability such as carbonate may be included.

It is another object of the invention to provide a versatile welding flux binder which allows incorporation of temperature sensitive alloy powders or other materials into the flux.

It is a still further object of the present invention to provide a welding flux binder which produces a welding flux with relatively high fired strength.

SUMMARY OF THE INVENTION

A welding flux binder and welding flux comprising the reaction product of a hydrolyzed and polymerized organometallic compound such as a metal alkoxide, a metal ester, or a metal oxalate. In the present invention, the welding flux binder is formed by hydrolyzing the organometallic compound and then polymerizing to form a gel glass phase. In the preferred embodiment, the organometallic compound is tetraalkylorthosilicate or tetraalkylorthotitanate. Calcium is added to the binder mixture to stabilize the binder, and to make the gel soluble in water and chemically resistant by blocking the structure and suppressing diffusive processes. Potassium is added to significantly reduce the viscosity of the glass, thereby lowering the temperature required to sinter the binder.

The welding flux binder is formed using a sol-gel process comprising:

(1) dissolving an organometallic compound, or mixtures thereof, in an organic solvent such as alcohol;

(2) adding elements from Group I and Group II of the Periodic Table to water, wherein the sources of the alkali and alkaline earth ions are compounds soluble in alcohol, such as nitrates, iodides, salicylates, acetates and carbnates of sodium, potassium, lithium, magnesium, calcium, barium, and combinations thereof;

(3) combining the organometallic solution with the water-ion solution;

(4) optionally adding metal carbonates, fluorides, flux, reactive metals, and other solids;

(5) mixing the solution until a gel forms;

(6) drying the gel; and (7) sintering the dried gel, usually at a temperature between 500° and 1100° C.

There are a number of variables in the production of welding flux binders using a sol-gel process. Examples of variables include the particle size and size distribution of the organometallic compound, relative concentration of reagents, presence of impurities in the reagents, the hydrolysis time, the pH of the hydrolysis solution, and the time and temperature at which the binder and flux are sintered. When hydrolysis is relatively fast, large, condensed polymers are found during gelation. When the gels with large, condensed polymers are allowed to dry, they form a low density, coarse gel. Low density gels require higher temperatures to sinter and densify than high density gels. Other variables include the mole percent alkali or alkaline earth ions such as potassium or calcium. For example, an excess of calcium in the binder can lead to weak binding of the flux particles.

DETAILED DESCRIPTION OF THE INVENTION

The present invention is a welding flux binder and a welding flux containing the sintered binder which is the reaction product of at least one organometallic compound such as a metal ester, a metal alkoxide, or a metal oxalate. In the preferred embodiment, the organometallic compound is an alkoxide precursor to a ceramic binder such as tetraalkylorthosilicate (TAOS) or tetraalkylorthotitanate (TAOT). The organometallic compound is hydrolyzed and polymerized with elements selected from Group I and Group II of the Periodic Table. The weld flux made with the disclosed binder has the following formula:

wherein M is lithium, sodium, potassium or other element in Group I of the Periodic Table, M' is magnesium, calcium, barium or other element in Group II of the Periodic Table, and wherein N is silicon, titanium, zirconium or aluminum and X is between 1 and 2.

Examples of metal alkoxides useful in the present invention include tetraalkylorthosilicate, tetraalkylorthotitante, tetraalkylorthozirconate, and trialkylaluminate, wherein the alkyl group is —$CH_3$, —$C_2H_5$, —$C_4H_9$ or —$C_3H_7$. Examples of metal esters include metal acetates such as aluminum acetate, aluminum acetylacetonate, or aluminum butoxide. Examples of metal oxalates include titanium oxalate and zirconium oxalate.

The sol-gel process is a chemical method for making ceramics or high purity, highly homogeneous oxide materials. The process is based on the polymerization of organometallic compounds with metal salts. The organometallic compound and metal salts are dissolved in a solvent, then the metal compound/metal salt solution is hydrolyzed to initiate a polymerization or condensation reaction, wherein either water or alcohol is eliminated, thereby producing a gel. The gel is dried to produce a powder which can be sintered to form a glass or ceramic.

There are two main reactions involved in the sol-gel process. These are (1) hydrolysis of the metal compound/metal salt solution and (2) polymerization of the solution to form a gel. These reactions proceed simultaneously and their extent and rate of reaction depend on a number of variables, including quantity of water, pH, temperature, time of reaction and type of reacting species.

The welding flux binder of the present invention contains a homogeneous distribution of alkali and alkaline earth ions due to the reaction involving the organometallic compound and is non-hygroscopic due to the formation of CaO, MgO, BaO, or other oxides formed from Group II elements. The primary importance of this is that it reduces the incidence of hydrogen embrittlement in the weld made using either the shielded metal arc welding (SMAW) process or the submerged arc welding process (SAW). Unlike sodium silicate binders, the binder of the present invention contains a homogeneous mixture of metal ions with the other binder components. The alkaline earth oxide compounds, particularly calcium compounds, act as stabilizing agents and make the fired binder non-hygroscopic by making the gel insoluble in water and chemically resistant by blocking the structure to diffusive processes. The alkali compounds, particularly potassium, significantly reduce the viscosity of the glass, lowering the temperature required to sinter the binder.

In the preferred embodiment of the welding flux, the organometallic compound is reacted by first dissolving the compound in alcohol and then adding water to hydrolyze the organometallic compound. Alkali and alkaline earth metals, such as nitrites, iodides, salicylates, acetates and carbonates of sodium, potassium, lithium and calcium or other Group I and Group II elements, are added to the hydrolyzed organometallic compound. Metal carbonates, fluorides, flux and other solids are added to make the suspension approximately 10–50% solids. The suspension is neutralized, usually by addition of a base such as ammonium hydroxide, cast into a mold, and dried. The gel product is then sintered. The organic portion of the organometallic compound is removed in processing of the welding flux and is not present in the final product. In the final processed product, the binder comprises about 5–10% of the total mixture and the flux plus other solid additions makes up the remainder.

A number of materials may be included in the flux such as manganese oxide (MnO), silicone dioxide ($SiO_2$), zirconium oxide ($ZrO_2$), titanium oxide ($TiO_2$), fluorite ($CaF_2$), alumina ($Al_2O_3$), magnesia (MgO), iron oxide (FeO), barium oxide (BaO), and calcia (CaO). A commercially available MnO-$SiO_2$ flux is Linde 80 ™, manufactured by Union Carbide, New York, NY, in various particle sizes. Other solids which may be added to the flux material and binder, typically in an amount up to 50%, include any power which is insoluble in alcohol, including reactive metals such as iron, manganese, copper chromium, nickel, aluminum, titanium, vanadium, niobium, boron or compounds thereof. Dopants may also be added to the gel phase during the hydrolysis and polymerization of the organometallic compound.

The invention will be further understood from the following non-limiting examples, demonstrating the effect of order of addition of the various components of the welding flux binder and relative ratios of the binder components and their effect on the properties of the final fired products, and clearly establishing the non-hygroscopicity of the weld binder of the present invention relative to commercially available binders.

In example 1, the sensitivity of the hydrolysis reaction to the presence of the acid catalyst was demonstrated using welding flux binders prepared with the same gel composition but hydrolyzed for different lengths of time to determine the effect on final water retention. The components are shown in Table I.

TABLE 1

| Sample | 1 | 2 | 3 | 4 | 5 | 6 | 7 | 8 |
|---|---|---|---|---|---|---|---|---|
| mls. TEOS | 50 | 50 | 50 | 50 | 50 | 50 | 50 | 50 |
| mls. ethyl alcohol | 27 | 27 | 27 | 27 | 27 | 27 | 27 | 27 |
| mls. distilled water | 35 | 35 | 35 | 35 | 35 | 35 | 35 | 35 |
| drops nitric acid | 10 | 10 | 10 | 10 | 10 | 10 | 10 | 10 |
| g. $KNO_3$ (potassium nitrate) | — | 2.02 | — | 2.02 | — | 2.02 | — | 2.02 |
| g. $CaNO_3$ (calcium nitrate) | — | — | 3.49 | 3.49 | — | — | 3.49 | 3.49 |
| mls. $NH_4OH$ (ammonium hydroxide) | 50 | 50 | 50 | 50 | 50 | 50 | 50 | 50 |

| Sample | 9 | 10 | 11 | 12 |
|---|---|---|---|---|
| mls. TEOS | 50 | 50 | 50 | 50 |
| mls. ethyl alcohol | 27 | 27 | 27 | 27 |
| mls. distilled water | 35 | 35 | 35 | 35 |
| drops nitric acid | 10 | 10 | 10 | 10 |
| g. potassium nitrate | 2.02 | 2.02 | 2.02 | 2.02 |
| g. calcium nitrate | 3.49 | 3.49 | 3.49 | 3.49 |
| g. calcium carbonate | | | | 0.8 |
| g. Linde 80 TM | | | | |
| 200 mesh | 230 | | | |
| 100 mesh | | 230 | | |
| 60 mesh | | | 230 | |
| mls. ammonium hydroxide | 100 | 100 | 100 | |

Solutions consisting of a mixture of 50 mls. of tetraalkylorthosilicate (TEOS) and 27 mls. of ethyl alcohol and solutions consisting of 35 mls. distilled water with 10 drops of nitric acid were prepared. Potassium nitrate and calcium nitrate were added to the acid-water solutions as follows: Samples 1 and 5 contain no potassium nitrate nor calcium nitrate. Samples 2 and 6 contain 8 mol percent potassium. Samples 3 and 7 contain 6 mol percent calcium. Samples 4 and 8 contain 8 mol percent potassium and 6 mol percent calcium. The acid-water-ion solutions were then mixed with the TEOS-alcohol solutions. Each mixture was shaken vigorously and allowed to stand for 40 minutes while the TEOS hydrolyzed at a pH of 1.5. After 40 minutes, 50 mls. of ammonium hydroxide were added to samples 1–4. After 100 minutes, 50 mls. of ammonium hydroxide were added to samples 5–8.

Samples 9–12 were prepared in the same manner as sample 4. 2.02 g potassium nitrate and 3.49 g calcium nitrate were added to the nitric acid solution, mixed well, and then added to the TEOS-alcohol solution. The hydrolyzed TEOS-ion solution was thoroughly mixed with 230 g of Linde 80 TM flux. Sample 9 contained 200 mesh flux, sample 10 contained 100 mesh flux, and sample 11 contained 60 mesh flux. Sample 12 contained 0.8 g calcium carbonate in addition to the potassium nitrate and calcium nitrate, for a final calcium concentration of 8.7 mol percent. After adding the Linde 80 TM flux particles, the mixture was poured into a beaker containing 50 mls of ammonium hydroxide and an additional 50 mls of ammonium hydroxide was immediately added to this solution.

Immediately upon addition of the ammonium hydroxide, a white, non-uniformly textured gel formed, interspersed with excess ammonium hydroxide. The gel structure was very coarse. The samples were allowed to air dry for 4 days. The dried gel was sintered at 700° C. for 2 hours in a cleaned and weighed porcelain crucible using a preheated furnace. The fired samples were tested for hygroscopicity by exposure to 95–99% humidity at 50° C. over a period of 4 days. For purposes of comparison, two commercial welding flux and binder systems are also tested for their hygroscopic properties. The first was a typical cellulose-bound electrode (6011) and the second a low-hydrogen electrode (7018). Samples of the flux, Linde-80 TM, mesh sizes, 200, 100, and 60, were tested as controls.

The amount of adsorbed water was determined by measuring the weight differential after exposure to high humidity for four days and then firing at 200° C. for 2 hours. The samples were fired at 700° C. for an additional two hours to remove chemically absorbed water. Again, the weight differential before and after firing was determined to yield the weight percent chemically absorbed water. The results of the hygroscopic testing are shown in Table II.

Samples 9, 10 and 11 were measured using a Pycnometer to determine if the different flux particle sizes affected the amount of water retention by the sintered flux. Measurement of the surface areas per gram for each sample were calculated and used to determine the density of the flux.

TABLE II

| Sample | Physically Adsorbed Water loss Weight Percent | Chemically Absorbed Water loss Weight Percent |
|---|---|---|
| 1 | 2.1 | .357 |
| 2 | 0.5 | .192 |
| 3 | 2.1 | 1.427 |
| 4 | 1.8 | .016 |
| 5 | 1.6 | 7.791 |
| 6 | 1.1 | .672 |
| 7 | 4.3 | 1.570 |
| 8 | 0.6 | .523 |
| 9 | .044 | .023 |
| 10 | .048 | .008 |
| 11 | .050 | .011 |
| 12 | .6 | .770 |
| 13 | 26.1 | 21.64 |
| 14 | 5.6 | .136 |
| 15 | .03 | 0 |
| 16 | .02 | 0 |
| 17 | .11 | 0 |

The composition of samples 1–12 in Table II is shown in Table I. Sample 13 is the commercially available cellulose-bound electrode (6011) and sample 14 is the commercially available low-hydrogen electrode (7018). Samples 15, 16, and 17 are the Linde 80 TM flux, mesh sizes 200, 100, and 60, respectively.

The results shown that the level of adsorbed water generally rises slowly with increasing surface area but is affected by the presence of calcium ions. When Samples 9, 10 and 11 are compared, there is a almost linear relationship between adsorbed water and particle size. As particle diameter decreases, so does the level of adsorbed water. The resistance of the smaller particle size system to adsorption is probably due to tighter packing of flux particles and consequently improved sintering. As is readily apparent, the levels of adsorbed water for each of the Samples 1–12 is considerably less than for the standard commercial cellulose flux and binder, Sample 13, and significantly less than for the commercial low-hydrogen flux and binder, Sample 14.

The samples incubated for 40 minutes, Samples 1–4, show much lower chemically absorbed water levels than samples incubated for 100 minutes, Samples 5–8. The lowest amount of absorbed water is for Sample 4, a combination of TEOS, potassium nitrate and calcium nitrate. This sample showed a weight loss of only 0.016 weight percent. When the TEOS binders were combined with the Linde 80 TM flux, the weight percent water loss ranged from a low of 0.008 for the sample containing only the calcium nitrate to a high of 0.023 weight percent for the sample containing only the potassium ions. As shown by Sample 12, increasing the calcium content increases the amount of absorbed water loss.

These results significantly contrast with the weight percent water loss of 0.136 for the commercial low hydrogen flux and binder of Sample 14 and even more significantly with the commercially available cellulose-bound flux and binder of sample 13, which showed a water of 21.64 weight percent. There is no measurable water absorption by the flux itself.

As shown by Sample 4, the presence of both potassium and calcium ions decreases the amount of water absorption by the welding flux binder. The potassium ions form a potassium silicate with the silica, which has a lower sintering temperature than does plain silica. The lowered sintering temperature allows the binder to densify with a relatively low surface area. The calcium ions also form a calcium silicate which is non-hygroscopic and blocks water molecules from approaching the relatively hygroscopic potassium silicate, further reducing the level of absorbed water. The addition of sodium nitrate along with the calcium and potassium nitrates may be used to further reduce the required sintering temperature.

Although this invention has been described with reference to specific embodiments, it is understood that modifications and variations may occur to those skilled in the art. It is intended that all such modifications and variations be included within the scope of the appended claims.

What is claimed is:

1. A welding flux binder comprising:
    an organometallic compound selected from the group consisting of metal esters, metal alkoxides, metal oxalates, and comninations thereof,
    at least one element in Group I of the Periodic Table; and
    at least one element in Group II of the Periodic Table.

2. The welding flux binder of claim 1 wherein the organometallic compound is selected from the group consisting of tetraalkylorthosilicate, tetraalkylorthotitanate, tetraalkylorthozirconate, trialkylaluminate, and combinations thereof.

3. The welding flux binder of claim 2 wherein the alkyl group is selected from $-CH_3$, $-C_2H_5$, $-C_4H_9$ and $-C_3H_7$.

4. The welding flux binder of claim 1 wherein the organometallic compound is a metal oxalate, wherein the metal is selected from the group consisting of aluminum, zirconium, silicon, titanium, and combinations thereof.

5. The welding flux binder of claim 1 wherein the organometallic compound is a metal acetate, wherein the metal is selected from the group consisting of silicon, titanium, aluminum, zirconium and combinations thereof.

6. The welding flux binder of claim 1 wherein the element in Group I is selected from the group consisting of potassium, lithium, sodium, or combinations thereof.

7. The welding flux binder of claim 1 wherein the element in Group II is selected from the group consisting of clacium, magnesium, barium, and combinations thereof.

8. The welding flux binder of claim 3 comprising between 6 and 8 mol percent potassium and calcium.

9. A welding flux comprising a compound of the formula $$M_2O \cdot M'O \cdot NO_X$$

wherein:
M is selected from the elements in Group I of the Periodic Table,
M' is selected from the elements in Group II of the Periodic Table, and
N is selected from the group consisting of silicon, titanium, aluminum, zirconium, and combinations thereof, and
X is between 1 and 2,
wherein said compound is the reaction product of a hydrolyzed, polymerized organometallic compound selected from the group consisting of metal esters, metal alkoxides, metal oxalates and combinations thereof.

10. The welding flux of claim 9 wherein M is selected from the group consisting of potassium, sodium, lithium, and combinations thereof.

11. The welding flux of claim 9 wherein M' is selected from the group consisting of calcium, magnesium, barium, and combinations thereof.

12. The welding flux of claim 9 wherein the organometallic compound is selected from the group consisting of tetraalkylorthosilicate, tetraalkylorthotitanate, tetraalkylorthoziconate, trialkylaluminate, and combinations thereof.

13. The welding flux of claim 9 wherein the organometallic compound is a metal oxalate, wherein the metal is selected from the group consisting of aluminum, zirconium, silicon, titanium, and combinations thereof.

14. The welding flux binder of claim 9 wherein the organometallic compound is a metal acetate, wherein the metal is selected from the group consisting of silicon, titanium, aluminum, zirconium and combinations thereof.

15. The welding flux of claim 9 further comprising at least one metal oxide.

16. The welding flux of claim 15 wherein the metal oxide is selected from the group consisting of magnesium oxide, silicon dioxide, zirconium oxide, titanium oxide, alumina, magnesia, iron oxide, barium oxide and calcia.

17. The welding flux of claim 9 further comprising a fluoride compound.

18. The welding flux of claim 9 further comprising at least one metal powder.

19. The welding flux of claim 18 wherein the metal powder is selected from the group consisting of iron, manganese, chromium, nickel, aluminum, titanium, vanadium, niobium, copper, and boron.

20. A process for making a non-hygroscopic welding flux binder comprising:
   (1) dissolving an organometallic compound in an organic solvent, wherein said organometallic compound is selected from the group consisting of metal esters, metal oxides, metal alkoxides, and combinations thereof;
   (2) preparing an aqueous suspension of compounds selected from the group consisting of the elements in Group I and Group II of the Periodic Table;
   (3) forming a gel by combining the organometallic solution with the aqueous solution to hydrolyze and polymerize the organometallic compound; and
   (4) drying the gel.

21. A process for making a non-hygroscopic welding flux according to claim 20 further comprising adding compounds selected from the group consisting of metal oxides, metal carbonates, fluoride compounds, metal powders, flux particles and combinations thereof.

22. The process of claim 21 further comprising sintering the welding flux.

23. The process of claim 22 wherein the welding flux is sintered at a temperature between 500° and 1100° C.

* * * * *